Patented July 22, 1941

2,250,415

UNITED STATES PATENT OFFICE 2,250,415

HYDROCARBON CATALYSIS PROCESS

Robert E. Burk and Everett C. Hughes, Cleveland Heights, Ohio, assignors to The Standard Oil Company, Cleveland, Ohio, a corporation of Ohio No Drawing. Original application September 1, 1938, Serial No. 228,005. Divided and this application December 9, 1939, Serial No. 308,446

16 Claims. (Cl. 260—668)

This invention relates to catalysis, and more particularly catalysis involving operation on hydrocarbons; and it is among the objects of the invention to provide improved operating efficiency, and without undue complication. Other objects and advantages will appear as the description proceeds.

To the accomplishment of the foregoing and related ends, the invention, then, comprises the features hereinafter fully described, and particularly pointed out in the claims, the following description setting forth in detail certain illustrative embodiments of the invention, these being indicative, however, of but a few of the various ways in which the principle of the invention may be employed.

The raw material applicable for reaction may be non-benzenoid hydrocarbons, or fractions containing them, etc., and it is subjected to the action of a compound catalyst of peculiar character, and heat. In our work in oxide catalytic agents we have found that a combination of elements described hereinafter gives surprising results, and which are out of relation to the behavior of the individual components or other combinations. This catalyst may be prepared preferably from soluble salts of tin, aluminum and chromium for example by dissolving the salts in water at the rate of two mol per cent of tin, seventy-eight mol per cent of aluminum and twenty mol per cent of chromium, and the solution is treated with ammonia to neutralization. Thus, tin chloride and aluminum nitrate and chromium nitrate at the rate of 78.2, 2500, and 713 g. respectively, based on anhydrous salts, per 18.8 liters of distilled water, being brought into solution, the solution is warmed to about 55° C., and being introduced into a container provided with an agitator, concentrated ammonium hydroxide 2310 g. and 1500 g. ammonium acetate per 11.2 liters of distilled water is supplied. A blue-green precipitate is formed which is allowed to settle for about two hours, and the cake resulting is washed three times by dispersion into four liters of water, and is filtered. The precipitate is dried at about 140° F., and then under vacuum at about 400° F. A vitreous gel results. The proportions of tin and aluminum and chromium are most desirably those as above-indicated, but in general the tin need not advisably be less than one or more than thirty mol per cent and the aluminum not less than fifty nor more than ninety mol per cent, the remainder being chromium. In some instances antimony may replace all or part of the tin. Again in some instances beryllium may replace all or part of the aluminum. That is, an element from the group of laterally adjacent atomic numbers 50 and 51 in the periodic table and an amphoteric oxide forming element from the diagonally adjacent atomic numbers 4 and 13 in the periodic table and chromium may be combined. Thus, antimony chloride and aluminum nitrate and chromium nitrate at the rate of 68.4, 2500 and 713 g. respectively per 18.8 liters of distilled water, being brought into solution, the solution is warmed and with vigorous agitation ammonium hydroxide is introduced at the rate of 2310 g. of concentrated ammonium hydroxide with 1500 g. of ammonium acetate per 11.2 liters of distilled water. Again similarly, $SnCl_4$ and $Be(NO_3)_2$ and $Cr(NO_3)_3$ may be dissolved at the rate of 78.2, 1550 and 713 g. respectively per 18.8 liters of distilled water, and the solution being warmed and agitated ammonium hydroxide is introduced at the rate of 1820 g. of concentrated (28%) ammonium hydroxide and ammonium acetate 1500 g. in 11.2 liters of distilled water.

Where a part of the tin or aluminum is replaced by antimony or beryllium respectively, the catalyst involves tin and antimony and aluminum and chromium, or beryllium and aluminum and tin and chromium, or beryllium and aluminum and tin and antimony and chromium, etc., on the lines as indicated and within the proportions stated for the permissible ranges of the tin and aluminum components, the generic properties of the catalyst being maintained.

The compound catalyst is suitably granulated to provide interstitial spaces for passage of the material to be treated, in adequate contact, and is arranged in a reaction zone with adequate heating means, such that the temperature of the mass may be maintained around 500° C. most desirably, or at least in general not under about 375° or over about 675° C., the raw material being passed into contact with the catalyst. The pressure may be atmospheric to not in excess of about two hundred pounds per square inch, preferably a nominal pressure. The raw material, for illustration hydrocarbons normally gaseous such as ethane to pentane, pure hydrocarbons such as n-hexane, n-heptane, n-octane, etc., naphthas or distillates from stocks which are predominantly non-benzenoid, as for instance derived from Pennsylvania, Michigan, Kentucky, Ohio, Mid-Continent and the like petroleum, (for example Pennsylvania or Michigan naphthas in boiling range 60 to 215° C.), naphthenic naphtha, etc. is thus brought into contact with the catalyst, and the rate of feed or space-velocity depends somewhat upon the operating temperature and for instance in terms of liters of liquid per liter of catalyst may be 0.1 or up to 10. The products may be re-passed in whole or part, where desired. The aromatics and/or unsaturates in the products passing from the treating zone may be separated, e. g. by mixing with a solvent having the selective character of sulphur dioxide, or a high boiling amine, 0.75-3 or somewhat more volumes being employed, and the portion of the products not dissolved by the solvent may, on separation, be re-passed through the catalytic zone.

This application is a division of our application Ser. No. 228,005, filed Sept. 1, 1938.

Other modes of applying the principle of the invention may be employed, change being made as regards the details described, provided the features stated in any of the following claims, or the equivalent of such, be employed.

We therefore particularly point out and distinctly claim as our invention:

1. In a process of aromatizing hydrocarbons, subjecting a naphtha containing non-benzenoid hydrocarbons to a temperature of 375-675° C. and the action of an oxide contact-mass formed from co-precipitation from a solution of tin chloride and aluminum nitrate and chromium nitrate in proportions of substantially 2 and 78 and 20 mol per cent of tin, aluminum and chromium respectively.

2. In a process of aromatizing hydrocarbons, subjecting a naphtha containing non-benzenoid hydrocarbons to a temperature of 375-675° C. and the action of an oxide contact-mass formed from co-precipitation from dissolved salts of tin and aluminum and chromium, the tin in the contact mass being 1-30 mol per cent.

3. In a process of aromatizing hydrocarbons, subjecting a naphtha containing non-benzenoid hydrocarbons to a temperature of 375-675° C. and the action of an oxide contact-mass formed from co-precipitation from dissolved salts of antimony and aluminum and chromium, the antimony in the contact-mass being 1-30 mol per cent.

4. In a process of aromatizing hydrocarbons, subjecting a naphtha containing non-benzenoid hydrocarbons to a temperature of 375-675° C. and the action of an oxide contact-mass formed from co-precipitation from dissolved salts of tin and beryllium and chromium, the tin in the contact-mass being 1-30 mol per cent.

5. In a process of aromatizing hydrocarbons, subjecting a naphtha containing non-benzenoid hydrocarbons to a temperature of 375-675° C. and the action of an oxide contact-mass formed from co-precipitation from dissolved salts of chromium and an amphoteric oxide forming element from the group consisting of beryllium and aluminum, and an acid oxide forming element from the group consisting of tin and antimony, such amphoteric oxide forming element and acid oxide forming element in the contact-mass being 50-90 mol per cent and 1-30 mol per cent respectively.

6. In a process of the character described, subjecting a non-benzenoid hydrocarbon to a temperature of 375-675° C. and the action of an oxide contact-mass formed from co-precipitation from a solution of tin chloride and aluminum nitrate and chromium nitrate in proportions of substantially 2 and 78 and 20 mol per cent of tin, aluminum and chromium respectively.

7. In a process of the character described, subjecting a non-benzenoid hydrocarbon to a temperature of 375-675° C. and the action of an oxide contact-mass formed from co-precipitation from dissolved salts of tin and aluminum and chromium, the tin in the contact mass being 1-30 mol per cent.

8. In a process of the character described, subjecting a non-benzenoid hydrocarbon to a temperature of 375-675° C. and the action of an oxide contact-mass formed from co-precipitation from dissolved salts of antimony and aluminum and chromium, the antimony in the contact-mass being 1-30 per cent.

9. In a process of the character described, subjecting a non-benzenoid hydrocarbon to a temperature of 375-675° C. and the action of an oxide contact-mass formed from co-precipitation from dissolved salts of tin and beryllium and chromium, the tin in the contact-mass being 1-30 mol per cent.

10. In a process of the character described, subjecting a non-benzenoid hydrocarbon to a temperature of 375-675° C. and the action of an oxide contact-mass formed from co-precipitation from dissolved salts of chromium and an amphoteric oxide forming element from the group consisting of beryllium and aluminum, and an acid oxide forming element from the group consisting of tin and antimony, such amphoteric oxide forming element and acid oxide forming element in the contact-mass being 50-90 mol per cent and 1-30 mol per cent respectively.

11. In a process of the character described, at a temperature of 375-675° C. passing a non-benzenoid naphtha into contact at a rate of about one liter per hour per liter of catalyst with an oxide catalyst formed from co-precipitation from dissolved salts of antimony and aluminum and chromium, the antimony in the contact-mass being 1-30 mol per cent.

12. In a process of the character described, at a temperature of 375-675° C. passing a non-benzenoid naphtha into contact at a rate of about one liter per hour per liter of catalyst with an oxide catalyst formed from co-precipitation from dissolved salts of tin and beryllium and chromium, the tin in the contact-mass being 1-30 mol per cent.

13. In a process of the character described, at a temperature of 375-675° C. passing a non-benzenoid naphtha into contact at a rate of about one liter per hour per liter of catalyst with an oxide catalyst formed from co-precipitation from dissolved salts of chromium and an amphoteric oxide forming element from the group consisting of beryllium and aluminum, and an acid oxide forming element from the group consisting of tin and antimony, such amphoteric oxide forming element and acid oxide forming element in the contact-mass being 50-90 mol per cent and 1-30 mol per cent respectively.

14. In a process of the character described, subjecting a non-benzenoid hydrocarbon to a temperature of 375-675° C. and the action of an oxide contact-mass formed from co-precipitation from dissolved salts of antimony and aluminum and chromium, the antimony in the contact-mass being 1-30 mol per cent, separating aromatics from the product, and returning the non-aromatic portion of the product to the contact-mass.

15. In a process of the character described, subjecting a non-benzenoid hydrocarbon to a temperature of 375-675° C. and the action of an oxide contact-mass formed from co-precipitation from dissolved salts of tin and beryllium and chromium, the tin in the contact-mass being 1-30 mol per cent, separating aromatics from the product, and returning the non-aromatic portion of the product to the contact-mass.

16. In a process of the character described, subjecting a non-benzenoid hydrocarbon to a temperature of 375-675° C. and the action of an oxide contact-mass formed from co-precipitation from dissolved salts of chromium and an amphoteric oxide forming element from the group consisting of beryllium and aluminum, and an acid oxide forming element from the group consisting of tin and antimony, such amphoteric oxide forming element and acid oxide forming element in the contact-mass being 50-90 mol per cent and 1-30 mol per cent respectively, separating aromatics from the product, and returning the non-aromatic portion of the product to the contact-mass.

ROBERT E. BURK.
EVERETT C. HUGHES.